United States Patent
Delapedraja et al.

(10) Patent No.: US 7,926,052 B2
(45) Date of Patent: Apr. 12, 2011

(54) STACKED FILE SYSTEMS AND METHODS

(75) Inventors: Jaroslav Delapedraja, Fort Collins, CO (US); Mike Wenzel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1909 days.

(21) Appl. No.: 10/994,060

(22) Filed: Nov. 19, 2004

(65) Prior Publication Data
US 2006/0117298 A1 Jun. 1, 2006

(51) Int. Cl.
G06F 9/445 (2006.01)
G06F 1/24 (2006.01)
G06F 13/00 (2006.01)

(52) U.S. Cl. .......... 717/174; 713/100; 711/100
(58) Field of Classification Search .......... None
See application file for complete search history.

(56) References Cited

U.S. PATENT DOCUMENTS

| | | | |
|---|---|---|---|
| 6,026,402 A * | 2/2000 | Vossen et al. | 707/9 |
| 2001/0020245 A1* | 9/2001 | Golds et al. | 709/102 |
| 2004/0010473 A1* | 1/2004 | Hsu et al. | 705/77 |
| 2004/0216122 A1* | 10/2004 | Gram et al. | 719/310 |
| 2005/0273858 A1* | 12/2005 | Zadok et al. | 726/24 |
| 2006/0036568 A1* | 2/2006 | Moore et al. | 707/1 |
| 2006/0064536 A1* | 3/2006 | Tinker et al. | 711/100 |

OTHER PUBLICATIONS

Zadok et al., "FiST: A Language for Stackable File Systems", Jun. 2000, Columbia University, pp. 1-16.*
Awan et al., Stackably Extensible Template Layer for File System Development Under Windows NT (Family), Jul. 31, 2004, IEEE, pp. 74-82.*
Agarwalla et al., "Automating Provisioning of Complete Software Stack in a Grid Environment", Jul. 18, 2004, Georgia Tech, pp. 1-20.*
John S. Howard, "An Architecture for Creating and Managing Integrated Software Stacks", May 2003, Sun Microsystems, Inc., pp. 1-20.*
Erez Zadok, Ion Badulescu and Alex Shender, "Extending File Systems Using Stackable Templates," Computer Science Department, Columbia University, {ezk,ion,alex}@cs.columbia.edu.
John S, Heidemann and Gerald J. Popek, "File-System Development With Stackable Layers," ACM Transactions on Computer Systems, vol. 12. No. 1, Feb. 1994, pp. 58-89.
Erez Zadok and Jason Nieh, "FiST: A Language for Stackable File Systems," Computer Science Department, Columbia University, {ezk,ion,alex}@cs.columbia.ed, pp. 1-16.

* cited by examiner

*Primary Examiner* — Michael J Yigdall
*Assistant Examiner* — Ben C Wang

(57) ABSTRACT

Embodiments of a stacked file system and method are disclosed. One system embodiment includes a memory including a stack that includes a first module and a second module, the first module including executable code that has distinct functionality from executable code of the second module; and logic configured to create a stack template comprising information about the stack.

50 Claims, 6 Drawing Sheets

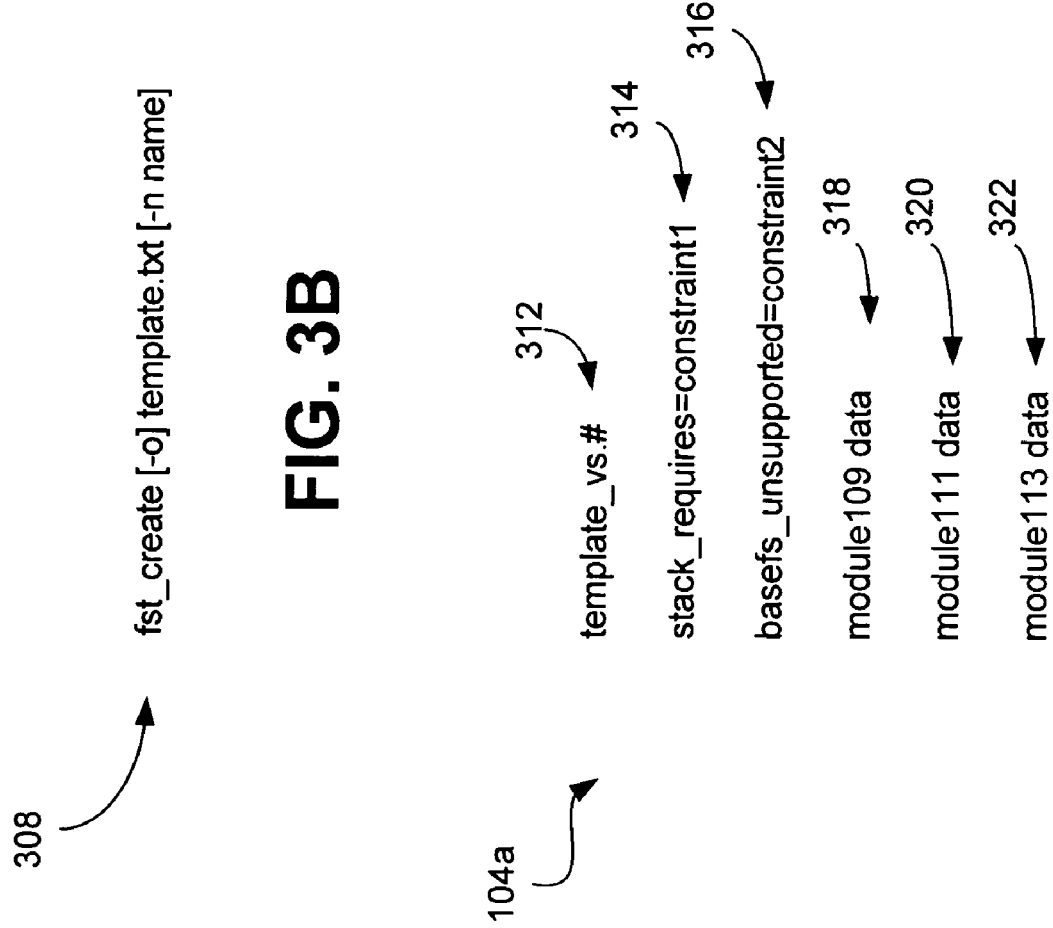

STACKED FILE SYSTEMS AND METHODS

BACKGROUND

File system stacking is a well-documented technique for modular development of file systems. File system stacks include modules of code organized in a manner that enable operations flow through the entire stack. The stack of modules are generally executed in sequence to complete an operation. For example, a base module of a file system stack may have responsibility for managing files, and another module on the file system stack may be dedicated to encryption. During an operation, such as a write operation, encryption of data occurs first, then the encrypted data is passed along to the next level down to the base, which stores the encrypted data in a file. Thus, each level on the file system stack performs its dedicated operation and then passes data down to the next level.

File system stacking is underused in industry. One possible reason is that stacks can be difficult to manage, often because of the problems inherent in systems that allow users to combine software modules into unexpected configurations. Other problems involve the difficulty in enforcing dependencies between modules, and the fact that module stacks are usually built in ad-hoc fashion with no provision for stack re-use. Because of these and other problems, stacks may contain incompatible modules, which can introduce or aggravate system instability.

SUMMARY

An embodiment of a stacked file system comprises a stacked file system, the stacked file system comprising a memory including a stack that includes a first module and a second module, the first module including executable code that has distinct functionality from executable code of the second module; and logic configured to create a stack template comprising information about the stack.

An embodiment of a stacked file method comprises providing a text file corresponding to a stack that includes a first module and a second module, the first module including executable code that has distinct functionality from executable code of the second module; and providing a stack template comprising information about the stack.

An embodiment of a stacked file system comprises means for storing a stack comprising a first module and a second module, the first module and the second module including executable code; and means for providing a stack template comprising information about the stack.

An embodiment of a computer program for creating a stack template stored on a computer-readable medium comprises logic configured to create a text file corresponding to a first module and a second module configured in a stack, the first module including executable code that has distinct functionality from executable code of the second module; and logic configured to create a stack template comprising stack information.

An embodiment of a computer comprises a memory including a stack that includes a first module and a second module, the first module including executable code that has distinct functionality from executable code of the second module; an operating system comprising logic configured to create a stack template comprising information about the stack; and a processor configured to execute the logic and the executable code.

An embodiment of a stacked file system comprises a memory including a stack that includes a first module and a second module, the first module including executable code that has distinct functionality from executable code of the second module; and logic configured to determine if the stack is valid, and if so, create a stack template comprising information about the validated stack.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

FIG. 3B is a programming diagram that illustrates an example command line that may be entered by a user for invoking the method illustrated in FIG. 3A.

FIG. 3C is a programming diagram that illustrates an embodiment of a stack template created by the method illustrated in FIG. 3A.

DETAILED DESCRIPTION

Figure 1:
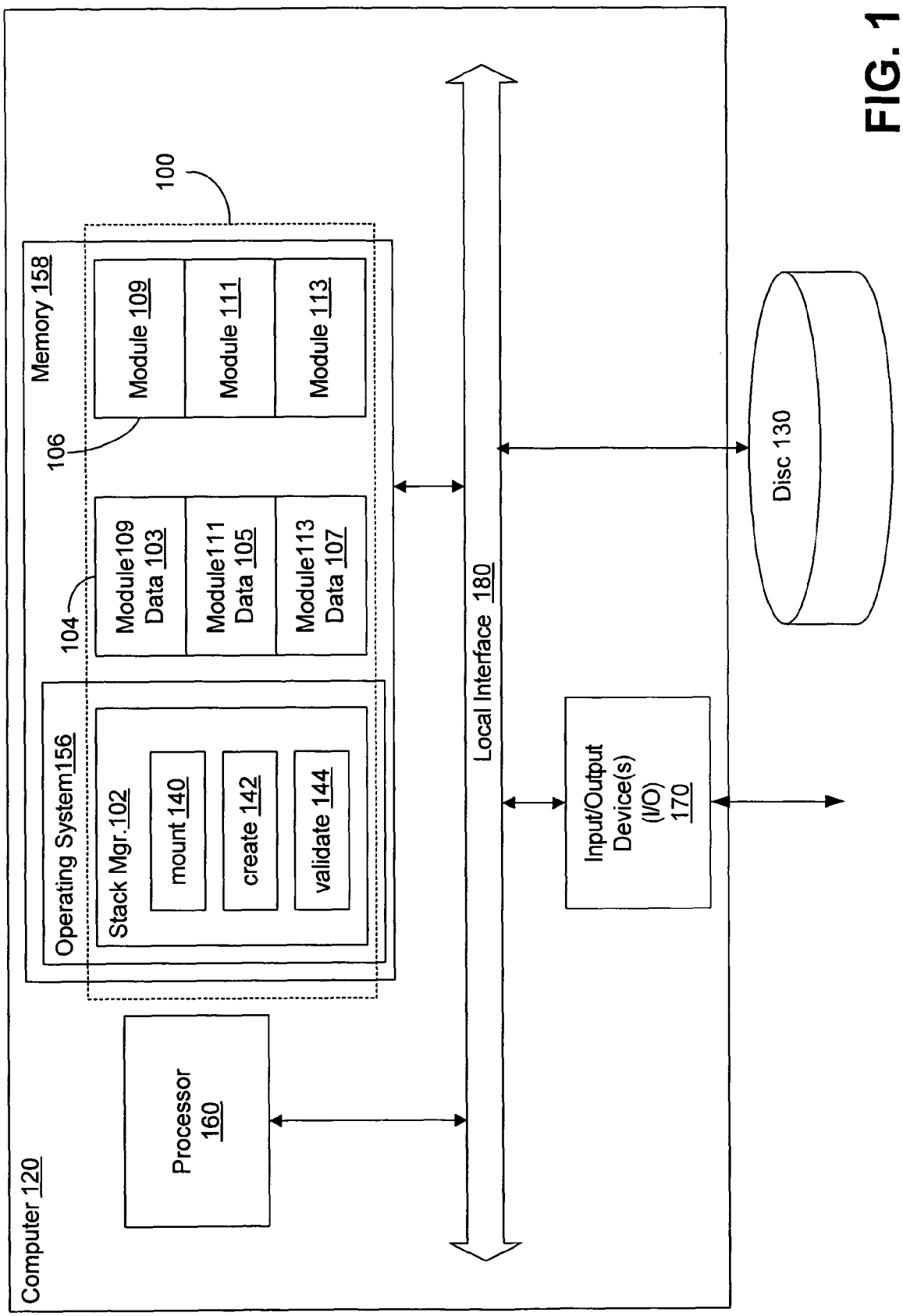
FIG. 1 is a block diagram that illustrates an example implementation for an embodiment of a stacked file system.

Disclosed herein are various embodiments of a stacked file system and method, herein referred to as a stacked file system for brevity. In general, a stacked file system includes functionality to create, validate, and manage stacks using a file structure referred to as a stack template (also referred to as a stack template file). For stacked file systems, one or more stack templates enable a user to compose software features into safe, correct, reliable, and reusable stacks, and to store information about those stacks directly on disk, along with their corresponding data. These stacks can in turn be treated as completely new stacked file system types, built and defined entirely by end-users by combining off-the-shelf, stackable modules into functional stacks. For example, a stacked file system can include a few ready-to-use stack templates along with functionality to enable users to build their own stack templates by combining modules that provide features of interest. From a user perspective, stack templates can be seen as descriptions of "favorite" stacks for easy re-use on one or more disks or other storage media.

A module as used herein generally refers to a piece of code that performs a service (e.g., a feature or option provided by a module) or one or more specific functions. Although a stacked file system is described in the context of modules that perform some specific file system functionality and pass remaining operations through to modules below it on a stack, the disclosed systems and methods can be applied to general applications and/or services. For example, in the case of a JAVA application, a stack can be comprised of an application, JAVA, and an operating system that supports JAVA (e.g., WINDOWS). Instead of installing the three pieces of code separately, a stack can be created that comprises the three pieces of code, enabling a single installation and enabling storage of the corresponding stack template on a portable disk.

One feature of a stacked file system is that of establishing the validity of file system stacks before any stack is ever created with a mount command, such as a mount( )syscall as used in UNIX systems. Specifically, the mount( )operation is not used to build stacks, but rather to instantiate stacks whose structure is already known to be safe, correct, and reliable. For example, in HEWLETT PACKARD's operating system, HP-UX, a mount( )operation will take the name of a base file system and the name of a stack template to instantiate a stack. Note that reference to base file system herein will be understood to include both reference to the lower-level kernel code and the higher level user space representation of the kernel code. Within the kernel code of the mount( )operation, a stack is built using the template above the base file system (from the arguments of the mount( )operation), and the entire stacked file system code is mounted and initialized. Although described in the context of UNIX or UNIX-type systems, analogous operations performed by other types of operating systems may apply. For example, an analogous operation to a mount( )syscall can be found in operations using WINDOWS, such as when inserting a CD or plugging in a USB key to enable access to files on the CD or attached device. Further, the principles of the disclosed stacked file system can be applied to different operating system mount operations. For instance, in LINUX, a three-level stack uses three separate mount( ) calls, each call pushing a new level onto the stack. Using a stack template, the stack template can be read and then converted into multiple calls to mount (one call for each level in the stack template).

Another feature of a stacked file system is that a "blueprint" for a stack structure is stored in a database of objects referred to as a stack template. A stack template describes modules on a stack, including any instance-specific options for each module. In a stacked file system, stack templates are a mechanism for storing blueprint information about stacks before and after they are created. Further, stacked modules of a stacked file system include information about constraints on their use, enabling stacks to be validated.

Figure 2:
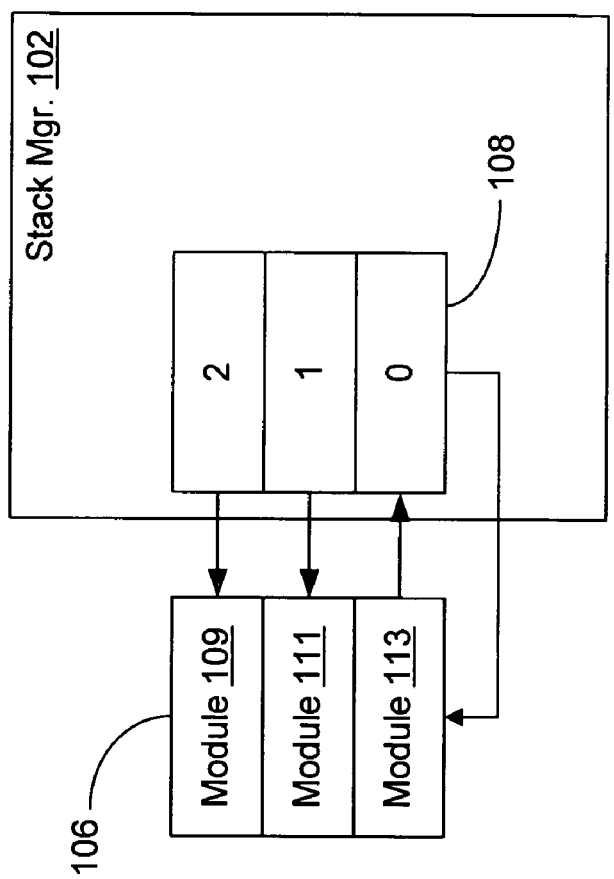
FIG. 2 is a block diagram of an embodiment of a kernel stacking infrastructure of the stacked file system shown in FIG. 1.
Figure 3A:
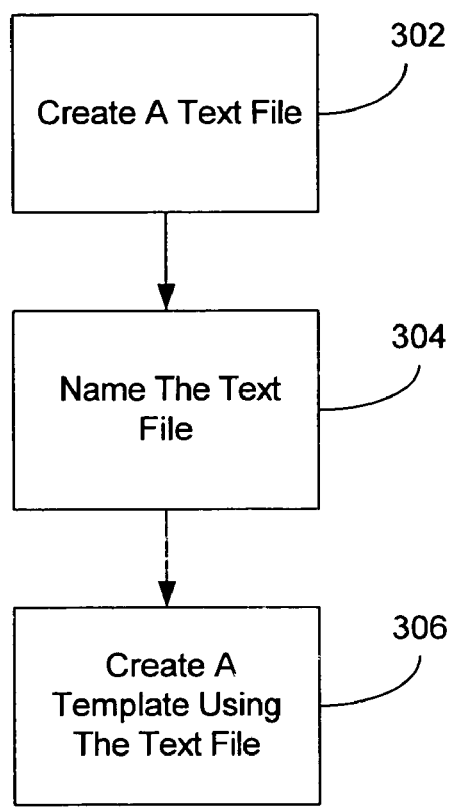
FIG. 3A is a flow diagram that illustrates a method embodiment for creating a stack template in the stacked file system shown in FIG. 1.
Figure 4:
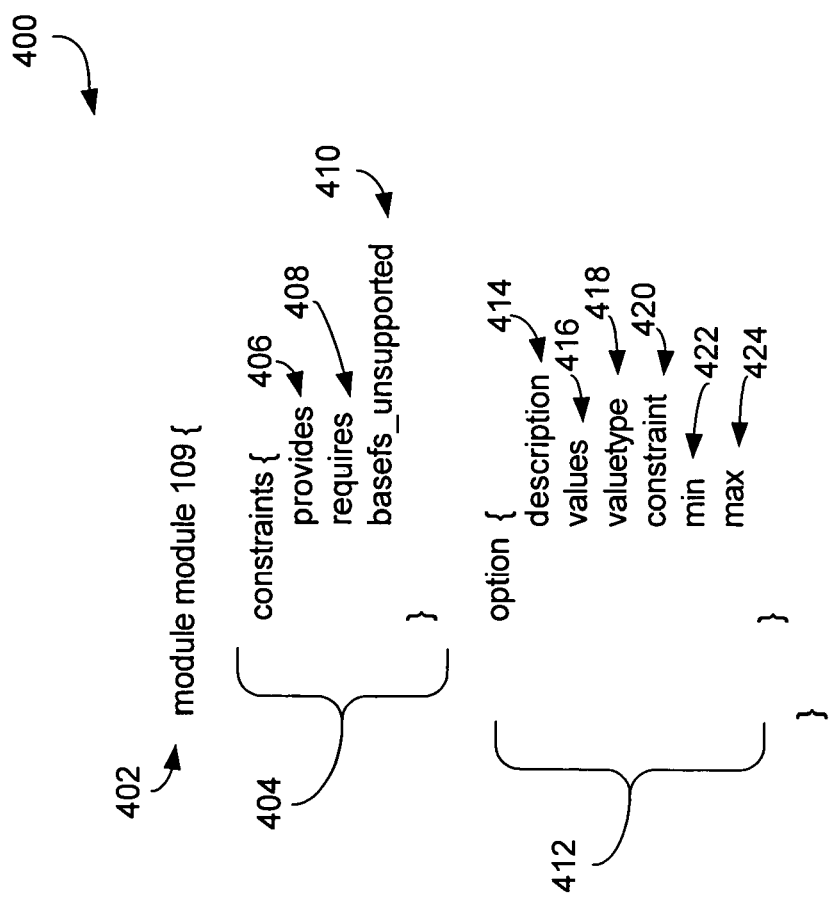
FIG. 4 is a programming diagram that illustrates an embodiment of a module definition file for a module of the stacked file system shown in FIG. 1.
Figure 5:
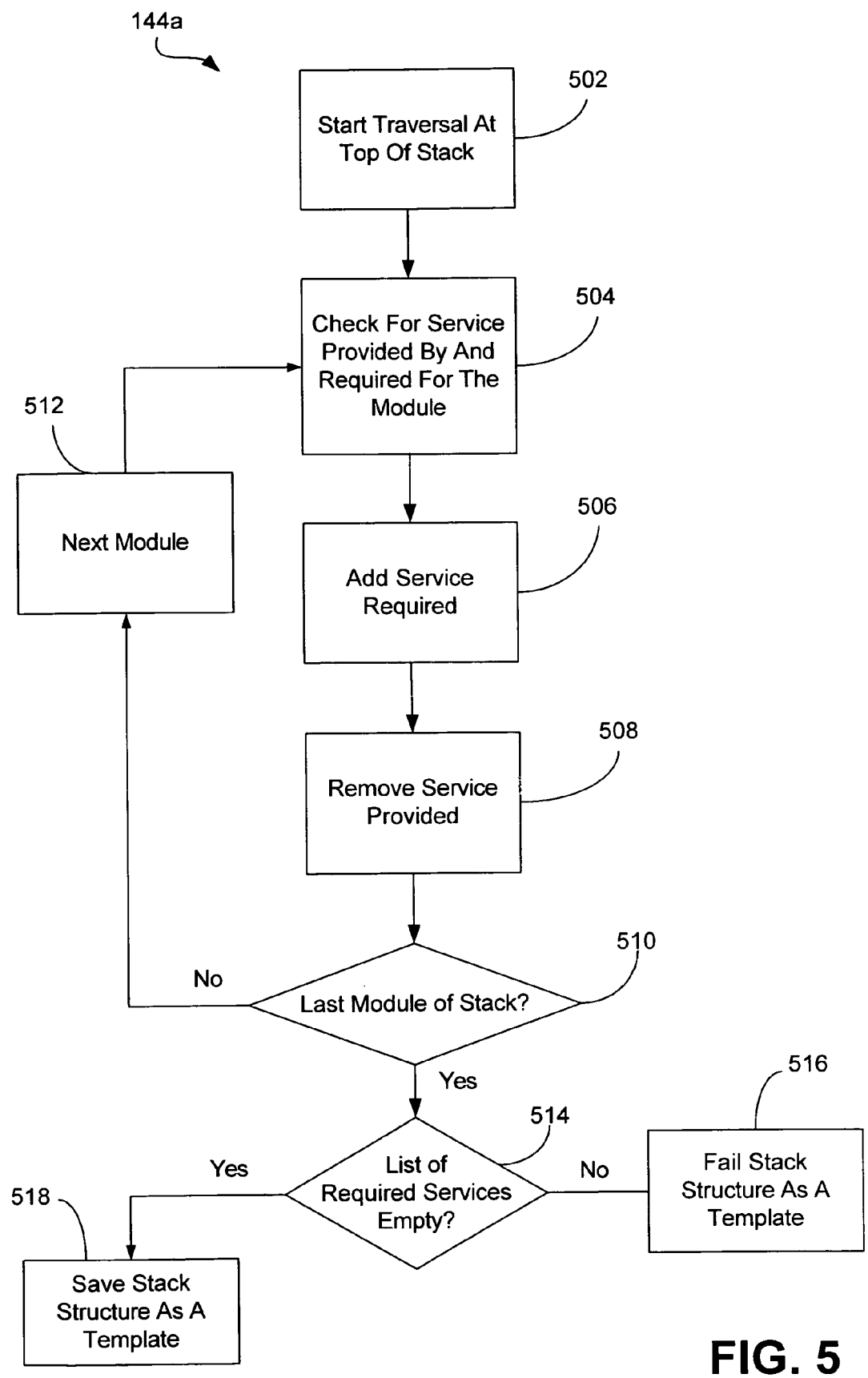
FIG. 5 is a flow diagram that illustrates a method embodiment for validating a stack in the stacked file system shown in FIG. 1.

An implementation for a stacked file system and an embodiment of a stacked file system are illustrated in FIGS. 1 and 2, respectively, followed by an illustration of a method embodiment for creating a stack template in FIG. 3A. FIGS. 3B and 3C illustrate an example command line to enable a user to invoke stack template creation and an embodiment of a stack template, respectively. Validation of a stack is enabled by the incorporation of a module definition file for each module, as illustrated in FIG. 4. FIG. 5 illustrates an embodiment of a validation method.

Any process descriptions or blocks in flow diagrams used herein should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved.

FIG. 1 is a block diagram showing an example implementation for an embodiment of a stacked file system 100. The stacked file system 100 can be implemented in whole or in part in a computer 120 or computer-like device. The stacked file system 100 includes a stack manager 102, one or more stack templates 104, and one or more corresponding stacks 106. The stack manager 102 includes a mount module 140 that includes functionality to mount a base file system to a stack template (and/or to mount stack templates with other stack templates) and to mount code corresponding to the base file system to a stack represented by the stack template, a template create module 142 that includes functionality to create a stack template, and a validate module 144 that includes functionality to validate a proposed stack (by validating the proposed stack template). The stacked file system 100 may include fewer or additional components shown in the computer 120. Generally, in terms of hardware architecture, the computer 100 includes a processor 160, memory 158, and one or more input and/or output (I/O) devices 170 (or peripherals) that are communicatively coupled via a local interface 180. The local interface 180 can be, for example but not limited to, one or more buses or other wired or wireless connections. The local interface 180 may have additional elements, which are omitted for simplicity, such as controllers, buffers (caches), drivers, repeaters, and receivers, to enable communications. Further, the local interface 180 may include address, control, and/or data connections to enable appropriate communications among the aforementioned components.

The processor 160 is a hardware device for executing software, particularly that which is stored in memory 158. The processor 160 can be any custom made or commercially available processor, a central processing unit (CPU), an auxiliary processor among several processors associated with the computer 120, a semiconductor-based microprocessor (in the form of a microchip or chip set), a macroprocessor, or generally any device for executing software instructions.

Memory 158 can include any one or combination of volatile memory elements (e.g., random access memory (RAM, such as DRAM, SRAM, SDRAM, etc.)) and nonvolatile memory elements (e.g., read-only memory (ROM)). Memory 158 cooperates through the local interface 180 among other interfaces not shown to communicate with a persistent storage device 130 that may be configured as a hard drive, CDROM, etc. In some embodiments, memory 158 may incorporate electronic, magnetic, optical, and/or other types of storage media. Note that memory 158 can have a distributed architecture, where various components are situated remote from one another, but can be accessed by the processor 160.

The software in memory 158 may include one or more separate programs, each of which comprises an ordered listing of executable instructions for implementing logical functions. In the example of FIG. 1, the software in memory 158 includes a suitable operating system (O/S) 156 and one or more object-oriented databases or data structures configured as a stack template 104. The stack template 104 includes module data (module109 data 103, module111 data 105, and module113 data 107) corresponding to one or more modules of a stack 106 (here shown comprising three modules 109, 111, and 113 as an exemplary illustration). The operating system 156 comprises the stack manager 102, which provides for the creation, validation, and management (e.g., mounting) of stack templates. In general, the operating system 156 essentially controls the execution of other computer programs, and provides scheduling, input-output control, file and data management, memory management, and communication control and related services.

The stack manager 102 is a source program, executable program (object code), script, or any other entity comprising a set of instructions to be performed. The stack manager 102 can be implemented as a single module with stack management, creation, and validation functionality, or as a distributed network of modules of like-functionality. When the stack manager 102 is a source program, then the program is translated via a compiler, assembler, interpreter, or the like, which may or may not be included within the memory 158, so as to operate properly in connection with the O/S 156.

The I/O devices 170 may include input devices, for example but not limited to, a keyboard, mouse, scanner, microphone, etc. Furthermore, the I/O devices 170 may also include output devices, for example but not limited to, a printer, display, etc. Finally, the I/O devices 170 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computer 120 is in operation, the processor 160 is configured to execute software stored within the memory 158, to communicate data to and from the memory 158, and to generally control operations of the computer 120 pursuant to the software. For example, the stack manager 102, in whole or in part, is read by the processor 160, perhaps buffered within the processor 160, and then executed.

When the stacked file system 100 is implemented at least in part in software, as is shown in FIG. 1, it should be noted that one or more components of the stacked file system 100 can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. One or more components of the stacked file system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer-readable medium may be portable, such as an optical disk (e.g., CD).

In one embodiment, the stacked file system 100 can conceptually be understood as including two broad areas of functionality: a user space infrastructure and a kernel stacking infrastructure. A user space infrastructure comprises functionality to enable a user to define what stacks can be built, and includes stack templates, commands to operate on them, and module definition files, as described below. A kernel stacking infrastructure embodiment is shown in FIG. 2. To represent a stack, the stack manager 102 may include an array of pointers 108 (represented as blocks labeled 0-2). Each block (0-2) in the array of pointers 108 points to the corresponding structure (module 113, 111, and-109, respectively) of the stack 106. In one implementation, the lowest level of the stack (in this case, module 113) is used as a handle to represent the entire stack 106. In other words, all lookup operations and non-file system code modules deal strictly with module 113, unaware that stacked modules 111 and 109 exist. For modularity, stacked modules 111 and 109 may be unaware of exactly what level of the stack 106 they exist in, and they may not have direct access to the array of pointers 108. Stacked modules 109 and 111 can find their data structures using accessor functions from a stacked module applications programming interface (API). At all times, the notion of "currently executing stack level" will be maintained by the stack manager 102. In some embodiments, other mechanisms may be used to keep track of the modules and their order in a stack. For example, the modules of a stack can be linked together in a linked list structure.

A user-space infrastructure of the stacked file system 100 (FIG. 1) enables user interaction in building stack templates, and includes a set of user-space commands that are utilized by the stack manager 102 (FIG. 1) to maintain a stack template database and prevent users from creating templates for incorrect or unstable stacks. In one embodiment, only after validating a user's proposed stack template will that template actually be usable in a mount( ) invocation. By separating stack validation from mount( ) operations, stack validation is moved to user-space, which can optimize the speed of mount( ) operations and/or reduce the complexity of kernel infrastructure code. With continued reference to FIG. 1, FIG. 3A is a flow diagram that illustrates a method embodiment 142a for stack template creation as performed by the template create module 142 of the stack manager 102 in cooperation with a user. In one implementation, a text file is created (302) and the file is named (304). In other words, a user creates a stack template by first writing a file that includes information (e.g., data) about stackable file system modules (and mount options) for a stack. The contents of the text file can be "user-visible" contents of a stack template. In other words, the "user visible" contents include the parts of a stack template that a user may need or want to know about. For example, for modules 109, 111, and 113, all the user may need or want to know is that those three modules are on a stack. Internally, the stack template 104 may include more information (e.g., services provided for and required by the template as a whole) to later allow combinations with other templates. The stack template 104 may also include other information, such as the date it was created. Generally, the user does not care about this information (i.e., all he or she may care about is that the stack template 104 includes information about modules 109, 111, and 113). The text file may include information about one or more modules to perform the desired functionality. A stack template is then created using the text file (306).

In general, a stack template created by the method described above provides a data structure that is somewhat similar to the text file that the user observed, except that a stack template provides a mechanism to store the same information that was in the text file plus additional information described below (e.g., date created, services provided, etc.). A stack template may include validated contents, and can be securely stored so that its contents can be trusted during a mount( ) operation. In other words, rather than trusting a user's text file, the text file can be passed through a validation process and stored in a trusted location (e.g., a location that a user cannot directly access) referred to as a stack template database (not shown). The stack template database can be implemented as a set of text files in a directory that is unknown to a user, or as an actual relational database.

FIG. 3B illustrates an example of a command line 308 for enabling user interactivity in creating a stack template. In some embodiments, the command line 308 can be replaced with GUIs implementing like functionality that can interpret module definition files and guide users through a process of stack creation. Calling "fst_create" with the named text file as an argument will create a stack template that includes information about each module identified in the text file. Note that the use of this command and other command line notations are for illustrative purposes, and other syntax can be used. Various options can be used in the command line, including an "-o" option, which can be used to overwrite (e.g., edit) an existing stack template of the same name. Another option includes an "-n" option, which can be used to specify a name for a stack template. Without the "-n" option, the name of a stack template can take on the name of the text file. Also, the entire user visible contents of a stack template can be included in the command line rather than in a separate file (e.g. "fst_Create—n name includes module 113 data 107, module 113 data_options, module 111 data 105, module 111 data_options, module 109 data 103, module 109 data_options").

FIG. 3C illustrates an embodiment of a stack template 104a created by the method 142a illustrated in FIG. 3A. The stack template 104a includes information about each module of the named text file as well as some additional information, such as a stack template version number and information about what a base file system needs to be (e.g., constraints imposed by the stack template 104a to be mounted on a base file system). In some embodiments, the stack template 104a may not include base file system constraints where the base file system and information about the modules are self-contained in a stack template. The information included in the stack template 104a may also include constraints for enabling mounting with other templates (corresponding to stacks on stacks). The stack template 104a is read by a kernel stacking infrastructure (e.g., mount module 140 of the stack manager 102, FIG. 2) at mount time. The stack template 104a may be configured in an ASCII line-oriented format, similar to the format of "user visible" template data described above. The stack template 104a includes a version number line 312, a stack requirement constraint line 314, an unsupported file system constraint line 316, and lines 318, 320, and 322 corresponding to the module data 103, 105, and 107, respectively, created from the method 142a. Note that arguments for each line are not shown for purposes of brevity.

Although shown using data for three modules (103, 105, and 107), a stack template can be configured with fewer or more module data.

The version number line 312 is a version string, enabling changes in the format in the future without creating incompatibility. The stack requirement constraint line 314 and unsupported file system constraint line 316 specify constraints on base file systems to be used with the stack corresponding to this stack template, both in terms of features needed and an explicit list of unsupported base file systems. For example, lines 314 and 316 are written by the stack manager 102 (FIG. 1) responsive to the "fst_create" command after the stack manager 102 (FIG. 2) has analyzed a file system stack and decided what constraints that stack imposes on base file systems. Note that constraints within the stack have already been checked by the stack manager 102 via "fst_create" prior to determining compatibility with base file systems, and the stack manager 102 learns about all of these constraints by reading the relevant stacked module definition files (as described below).

The stack requirement constraint line 314 ("stack_requires") lists specific features that not all base file systems will implement, for example special input/output controls, named streams, etc. In one implementation, these features may be defined as strings for template file names and as bits or version numbers for base file system structures. For example, kernel mount code of the stack manager 102 (FIG. 1) reads the stack requirement constraint line 314 and checks that all of the corresponding feature bits are set in the base file structure's version field. If the kernel mount code finds any unknown features in the stack requirement constraint line 314, it will fail all mounts involving this stack template (e.g., where a stack template corresponds to the top modules of a stack and the base file system is specified at mount time).

The unsupported file system constraint line 316 ("basefs_unsupported") may include a list of file systems that can be used to short-cut the feature checking described above. If at template creation time a given file system is known to be incompatible with the modules on a stack (e.g., causes one or more modules to fail, corrupts data, etc.), it can be listed here (316) to prevent the use of that stack with that particular file system.

One goal of these first lines (312-316) of the stack template 104a is that it should be easy for the kernel mount code of the stack manager 102 (FIG. 1) to read these lines and quickly determine if a template's module stack is compatible with a base file system. The stack template 104a can be validated at template creation time, but the base file system on which the stack template is "mounted" may not be known until mount time.

The remaining lines (318, 320, and 322) of the stack template 104a provide the stacked module file system type and mount option strings for all modules (e.g., modules 103, 105, and 107) on the stack.

Stack templates store information about a file system stack, such as the types of file system modules in a stack and their mount options. Modification of stack templates can be achieved through stack template commands that allow users to create only valid and supported file system stacks. The stack manager 102 (FIG. 1) knows what stacks are valid and supported by a module definition file included in all stack modules. In other words, all stacked file system modules will be required to deliver a module definition file along with their executable objects to the stack manager 102. Module definition files describe the module, its supported mount options, and constraints on its use. Module definition files may also (optionally) contain special-case listings of base file systems or stacked modules that they can or cannot work well with. Further, module definition files may also provide information about stacked file systems to administrative graphics user interfaces (GUIs). Through the use of module definition files, new stacked modules can be added to a system dynamically, without changing or recompiling the stack template commands or any relevant GUIs. Module definition files also enable stack templates (and thus stacks) to be validated at template creation time, enabling an improvement in performance since the mount code does not need to implement stack validation.

FIG. 4 is a programming diagram that illustrates an embodiment of a module definition file 400. The module definition file 400, though shown including information about a single module (e.g., module 109 (FIG. 1)), may include information about more than one module. Further, although shown having the name of the module to which it is associated, the module definition file 400 may take on other names. As in prior examples, the arguments for each line (except 402) are omitted for brevity. Line 402 includes a module statement, which includes all information about a module. The module name (e.g., module 109) is specified after the module keyword ("module") in the module statement. A module statement may include a series of statements of the types described below.

Stack constraints can be defined within a constraints statement 404. The constraints statement 404 includes a provides declaration 406, a requires declaration 408, and a basefs_unsupported declaration 410. The provides declaration 406 includes a list of services (not shown) provided by this module. The service names may be ASCII strings that do not necessarily have any meaning attached to them for purposes of parsing. Thus, the service names can be defined by the module writer to fit his or her needs as file system stack dependencies and protocols evolve over time.

The requires declaration 408 includes a list of services required by this module (i.e., services that must be provided by modules below it on the stack or by the base file system). During template creation, the service dependencies defined by the requires declarations 408 are checked along an entire stack, for example by traversing the stack from top to bottom. When services required by modules at the top of the stack are provided by lower-level modules on the stack, those service constraints will be considered satisfied. Any services not satisfied when the bottom of the stack is reached will be added to the list of the "stack_requires" services that are stored in the template itself. This final list can be checked at mount time, and the kernel (e.g., mount module 140, FIG. 1) will only allow the template to be used with base file systems that provide all of the required services.

The basefs_unsupported declaration 410 includes a list of base file systems with which the module cannot be used (or lists what base file systems the module is known to not work well with). A module or base file system may be listed because it is known to be incompatible with a given module, it could not be tested and qualified, or for other reasons. For example, the "basefs_unsupported" declaration 410 may be useful for specifying constraints that are due to qualification costs rather than specific service requirements. For instance, a module A and a module B (both not shown) may have no dependencies on each other, but it is possible that stacks with module A above module B could not be qualified before a release. To prevent untested stack permutations, module A could simply include module B in its "basefs_unsupported" list. These lists can also be used to short-cut some parts of stack validation (described below). After template creation, a completed stack template may include similar lines describing supported and unsupported file systems for an entire stack. The values for the entire stack are determined by fst_create by using logic such as, "the basefilesystem_unsupported list for an entire stack will be the Union of all of the basefilesystem_unsupported lists for each module on the stack." For example, if module A specifies basefs_unsupported=file system1, file system2, and module B specifies basefs_unsupported=file system3, then if each list is considered to be a set then the union of these sets is file system1, file system2, file system3. The union is a list of all the modules that are unsupported by that proposed stack template. So, attempts to use this stack template above a file system such as file system1 or filesystem2 should fail.

The constraints statement 404 may also include additional declarations. For example, the constraints statement 404 may include a "must_be_top" declaration (not shown) that can also be used by modules that are more effective at the top of every file stack. For example, the "must_be_top" declaration can be useful for modules that deliver security authentication services to guarantee that such modules will be the first to intercept (and potentially prevent) any file system operations.

The module definition file 400 may also include one or more mount options, such as those found in option statement 412. The mount options supported by a module are defined with an option statement 412. Each module can define as many options as needed. The option statement 412 can be used by the stack manager 102 (FIG. 1) responsive to the "fst_create" command to validate the mount options being used in a stack template. To make this validation more useful, the option statement 412 may include information about the types of values that the options can take through declarations. Possible declarations in an option statement 412 include description 414, values 416, valuetype 418, constraint, 420, minimum (min) 422, and maximum (max) 424, among others. Description 414 includes a text description of the option, which can be useful for populating GUIs. Values 416 includes the specific ASCII strings that are allowed as values of this option. Valuetype 418 includes the type of values that are allowed, including types integer or ASCII. Constraint 420 includes the constraints on integer values, such as power of 2, among others. Minimum 422 includes the minimum integer value allowed for this option, and maximum 424 includes the maximum integer value allowed for this option. If a stacked file system (e.g., stackable modules that do not yet include a base file system) does not want any constraints on the values of a mount option, it can simply define that mount option as "valuetype=ascii" with no more declarations. The constraint 420, min 422, and max 424 declarations are used with "valuetype=integer."

Although options are validated during template creation, these option statements 412 may also allow GUIs to learn what options are possible. For example, assume module A (not shown) supports two options: feature X=on or feature X=off. If module A defines these in a module definition file, then the GUI can read and parse that file and learn that these are options. Module A could then generate a window with checkboxes or some way that the user could choose between the two options. Without a file of this type, the GUI generally would have to be rewritten or recompiled whenever a new option is invented. With module definition files, the GUI can simply read a new definition file. The option statements 412 act as machine-readable documentation for a file system's mount options.

The process of validating stacks will largely depend upon stackable modules including information about constraints on their use. The validate module 144 of the stack manager 102 (FIG. 2) responsive to a "fst_create" command will use the information from those module definition files to validate new stack templates at template creation time. At a high level, the validation process involves traversing through a proposed stack and checking that it does not violate any requirements specified in the module definition files, such as module definition file 400 (FIG. 4).

FIG. 5 is a flow diagram that illustrates a method embodiment 144a of the validate module 144 of the stack manager 102 shown in FIG. 2 for validating a stack. In one embodiment, the method 144a is implemented in response to the "fst_create" command. Validation includes a traversal down down a proposed stack from a top module to a bottom module (502). Note that in embodiments where the stack templates include a base file system, traversal may occur in the reverse direction. However, for stack templates where the base file system is not specified until mount time, traversal from top-down is generally implemented. A module definition file for each module of the proposed stack is read and parsed. The stack validation method 144a checks for what services are provided by and required for the given module under investigation (504), with a list of required services being updated at each level by adding the services required at that level (506) and removing the services provided (508). The required services can be implemented as follows: stack_required=Union (stack_requires, requires for module). The provided services can be implemented as follows: stack_requires=stack_requires—(provides for this module), where higher-level requirements satisfied by this module are removed. The checking (504) may include determining whether the mount options in the proposed stack template are legal for that module and whether any stack-ordering constraints for that module exist. For example, checking may include reading the various declarations of a module definition file, including any "must_be_top" declarations and basefs_unsupported declarations (e.g., whether the list of modules are incompatible with the modules already iterated over), among other declarations. The basefs_unsupported can be implemented as follows: basefs_unsupported=Union (basefs_unsupported, basefs_unsupported for this module).

A determination is made as to whether there are other modules to check (510), and if so, the next module beneath the one just checked is read (512) and processing under 504-508 is repeated for the next module. If the list of required services is non-empty when the bottom of a proposed stack has been reached (514), validation of that proposed stack fails (516) and thus a stack template is not created for it. If the list is null, the stack is usable and safe, and information about the stack structure is saved in a stack template (518). In other words, when successful, the stack has been validated, and the stack_requires and basefs_unsupported declarations now include the requirements that apply to the entire stack template. The stack template can then be stored along with other stack templates. The "basefs_unsupported" constraints can also be trivially verified in a similar manner. In other words, traversal down a stack includes keeping track of the basefs_unsupported list from all modules above. If a module is encountered that a module above has specified as being unsupported, then the validation fails because the module just encountered is unsupported.

In some embodiments, instead of strictly disallowing unqualified stacks, the stack validation method 144a can warn (e.g., via a GUI) that an unqualified stack is being created, enabling a user an opportunity to force the creation of an unsupported template or abandon his or her efforts.

The stacked file system 100 (FIG. 1) is easily extensible post-release, supporting easy patching (e.g., bug fixes, small new features, etc.) of stacked modules without kernel modifications or system reboots. For instance, the space of constraints the stack validation method 144a can enforce is largely defined by the contents of the module definition file 400 (FIG. 4) and not by the validation algorithm itself. This means that as new modules are created or patched (and new module definition files are delivered), the stacked file system 100 can grow with new constraints without requiring changes to the basic system tools.

Additionally, since stack templates can be stored on-disk, removable media can contain a portable description of the module stack that was used to record its data. This enables file system functionality, such as implemented with UNIX, to be implemented, not just by a monolithic piece of code, but rather by small modules that may not necessarily be usable on their own.

Further, implementations of a stack template are described above under the assumption that stack templates are created and then stored on a disk for use by a machine (e.g., computer) where modules are already installed. However, in some embodiments, the executable code for each module may be stored for each module along with a stack template. For example, a module may be configured in a portable language such as JAVA, which enables the inclusion of the code for each module in the stack template, and thus the entire code stack may be read and assembled on a new machine that formerly did not have any of those modules installed. One result of this implementation is that disks include not just the data that they store, but also the executable code for the file system needed to read that data, and instructions for assembling that executable code into stacks of modules. For example, consider a USB key drive. One concern of these types of drives is that of security of data on the drive. That is, since the drive is easy to misplace, anybody who finds it can read the data on it. If encrypted, existing products that allow this encryption feature typically require a user to install a special driver on his or her machine, and then the USB key is readable only on the machine or machines that have that driver installed. Because of this constraint, it is often difficult to use USB keys to securely transfer data across many machines. If an operating system is configured to automatically load a stackable file system from the USB key to use for reading the data from the key, the USB key can include the code for the stackable file system module that implements encryption. Then, that USB key can be used on any machine that provided the operating system, without necessarily having first installed the encryption file system.

What is claimed:

1. A stacked file system, comprising:
   a memory including a stack that includes a first module and a second module, the first module including executable code that has distinct functionality from executable code of the second module;
   logic configured to validate the stack before the stack is created, based at least in part on a stack template, the stack template including a description of the first and second modules of the stack,
   wherein the logic is to validate a base file system constraint of the stack when the stack is mounted and
   wherein the stack template further includes at least one of a version string, a constraint on a base file system to be used with the stack template, a file system type of the first module and the second module, mount option strings for the first module and the second module, and a list of base file systems to be excluded in a mount operation corresponding to the stack template; and
   second logic to mount the validated stack to the base file system.

2. The system of claim 1, wherein the stack template further includes at least one of version number and base file system features needed to enable mounting with the stack.

3. The system of claim 1, wherein the stack further includes the base file system.

4. The system of claim 1, wherein the stack template further includes constraints for enabling stacking of the stack with a second stack corresponding to a second stack template.

5. The system of claim 1, wherein the stack template is configured in an ASCII line-oriented format.

6. The system of claim 1, wherein the logic is to store the stack template on a computer-readable medium.

7. The system of claim 1, further including a processor to execute the logic and the executable code of the first module and the second module.

8. The system of claim 1, wherein the logic is to create a plurality of stack templates.

9. The system of claim 1, wherein the second logic is to mount the stack corresponding to the stack template with one or more modules of at least one of a second stack template and the base file system.

10. The system of claim 1, wherein the logic is to validate the stack by determining compatibility between the first module and the second module of the stack.

11. The system of claim 10, wherein the logic is to determine compatibility by determining a service provided by the first module and a service provided by the second module and by determining a service required by the first module and a service required by the second module.

12. The system of claim 11, further comprising third logic to add a service required by at least one of the first module and the second module and remove a service provided by at least one of the first module and the second module.

13. The system of claim 12, wherein the logic is to fail creation of the stack if a required service is not provided for.

14. The system of claim 1, wherein the description of the stack includes first module data and second module data, wherein at least one of the first module data and the second module data includes a module definition file.

15. The system of claim 14, wherein the module definition file includes at least one of a description of the first module or the second module, supported mount options of the first module or the second module, constraints on use of the first module or the second module, a list of incompatible modules, and a list of incompatible file systems.

16. The system of claim 14, wherein the logic is to receive the module definition file corresponding to the first module and the second module.

17. The system of claim 1, wherein the stack template further includes the first module and the second module.

18. A stacked file method, comprising:
providing a text file corresponding to a stack that includes a first module and a second module, the first module including executable code that has distinct functionality from executable code of the second module, the text file listing the first module and the second module;
validating the stack before mounting the stack;
providing a stack template comprising information about the validated stack;
validating a base file system constraint of the stack; and
mounting the validated stack to a base file system, wherein the stack template further includes at least one of a version string, a constraint on the base file system to be used with the stack template, a file system type of the first module and the second module, mount option strings for the first module and the second module, and a list of base file systems to be excluded in a mount operation corresponding to the stack template.

19. The method of claim 18, wherein providing the stack template includes providing information about the first module and the second module.

20. The method of claim 19, wherein providing the stack template comprising the information includes providing at least one of version number and base file system features needed to enable mounting with the stack corresponding to the stack template.

21. The method of claim 18, wherein providing the text file corresponding to the stack includes providing information about the base file system.

22. The method of claim 18, wherein providing the stack template includes providing constraints for enabling stacking with a second stack corresponding to a second stack template.

23. The method of claim 18, wherein providing the stack template includes providing the stack template in an ASCII line-oriented format.

24. The method of claim 18, further including storing the stack template on a computer-readable medium.

25. The method of claim 18, wherein providing the text file and providing the stack template includes providing a plurality of text files and stack templates, respectively.

26. The method of claim 18, further including naming the text file.

27. The method of claim 18, further including mounting the stack corresponding to the stack template with one or more modules corresponding to a second stack template.

28. The method of claim 18, wherein validating the stack includes determining compatibility between the first module and the second module of the stack.

29. The method of claim 28, wherein determining compatibility includes determining a service provided by the first module and a service provided by the second module and by determining a service required by the first module and a service required by the second module.

30. The method of claim 29, further including adding a service required by at least one of the first module and the second module and removing a service provided by at least one of the first module and the second module.

31. The method of claim 30, further including failing creation of the stack if a required service is not provided.

32. The method of claim 18, wherein the information includes first module data and second module data, the first module data and the second module data each including a module definition file.

33. The method of claim 32, wherein the module definition file includes at least one of a description of the first module or the second module, supported mount options of the first module or the second module, constraints on use of the first module or the second module, a list of incompatible modules, and a list of incompatible file systems.

34. The method of claim 18, further including receiving a module definition file corresponding to the first module and the second module, the module definition file including at least one of a description of the first and second modules, supported mount options of the first and second modules, constraints on use of the first and second modules, a list of incompatible modules, and a list of incompatible file systems.

35. The method of claim 18, wherein the stack template includes the first module and the second module.

36. A stacked file system, comprising:
means for storing a stack comprising a first module and a second module, the first module including executable code that has distinct functionality from executable code of the second module, wherein the means for storing includes at least one of a memory and a disk;
means for validating the stack before mounting the stack;
means for creating a stack template comprising information about the validated stack;
means for validating a base file system constraint of the stack; and
means for mounting the validated stack to at least one of a base file system and a second stack template, wherein the stack template further includes at least one of a version string, a constraint on a base file system to be used with the stack template, a file system type of the first module and the second module, mount option strings for the first module and the second module, and a list of base file systems to be excluded in a mount operation corresponding to the stack template.

37. The system of claim 36, wherein the means for creating includes logic configured with a processor.

38. The system of claim 36, further including means for storing the stack template.

39. The system of claim 36, wherein the stack template includes the first module and the second module.

40. A tangible computer readable medium storing machine executable instructions, which, when executed, cause a machine to at least:
logic to create a text file which lists a first module and a second module that are in a stack, the first module including executable code that has distinct functionality from executable code of the second module;
logic to create a stack template comprising stack information;
logic to validate a base file system constraint of the stack;
logic to validate the stack before the stack is created based on the stack information: and
logic to mount the validated stack to the base file system, wherein the stack template further includes at least one of a version string, a constraint on a base file system to be used with the stack template, a file system type of the first module and the second module, mount option strings for the first module and the second module, and a list of base file systems to be excluded in a mount operation corresponding to the stack template.

41. The computer-readable medium of claim 40, further including logic to name the text file.

42. The computer-readable medium of claim 40, further including logic to mount the stack corresponding to the stack template with one or more modules of at least one of a second stack template and a base file system.

43. The computer-readable medium of claim 40, wherein the stack template includes the first module and the second module.

44. A computer, comprising;
a memory including a stack that includes a first module and a second module, the first module including executable code that has distinct functionality from executable code of the second module;
an operating system comprising create logic to create a stack template comprising information about the stack, validate logic to validate the stack before a mounting operation and to validate a base file system constraint of the stack, and mount logic to mount the validated stack; and
a processor to execute the logic and the executable code, wherein the stack template further includes at least one of a version string, a constraint on a base file system to be used with the stack template, a file system type of the first module and the second module, mount option strings for the first module and the second module, and a list of base file systems to be excluded in a mount operation corresponding to the stack template.

45. The computer of claim 44, wherein the create logic is to store the stack template on a computer-readable medium.

46. The computer of claim 44, wherein the computer includes a removable disk and a non-removable disk.

47. The computer of claim 44, wherein the mount logic is to mount the validated stack corresponding to the stack template with at least one of a second stack template and a base file system.

48. The computer of claim 44, wherein the stack template includes the first module and the second module.

49. A stacked file system, comprising:
a memory including a stack that includes a first module and a second module, the first module including executable code that has distinct functionality from executable code of the second module;
logic to determine if the stack is valid before the stack is created, and if so, to create the validated stack and a stack template comprising information about the validated stack and to validate a base file system constraint of the stack; and
second logic to mount the validated stack to the base file system, wherein the stack template further includes at least one of a version string, a constraint on a base file system to be used with the stack template, a file system type of the first module and the second module, mount option strings for the first module and the second module, and a list of base file systems to be excluded in a mount operation corresponding to the stack template.

50. The system of claim 49, wherein if the stack is not valid, the logic is to fail creation of the stack.

* * * * *

UNITED STATES PATENT AND TRADEMARK OFFICE
CERTIFICATE OF CORRECTION

| | | |
|---|---|---|
| PATENT NO. | : 7,926,052 B2 | Page 1 of 1 |
| APPLICATION NO. | : 10/994060 | |
| DATED | : April 12, 2011 | |
| INVENTOR(S) | : Jaroslav Delapedraja et al. | |

It is certified that error appears in the above-identified patent and that said Letters Patent is hereby corrected as shown below:

In column 14, line 61, in Claim 40, delete "information:" and insert -- information; --, therefor.

Signed and Sealed this
Eighth Day of November, 2011

David J. Kappos
*Director of the United States Patent and Trademark Office*